(12) United States Patent
Hung

(10) Patent No.: US 6,606,160 B1
(45) Date of Patent: Aug. 12, 2003

(54) NONDESTRUCTIVE TESTING OF DIFFUSELY REFLECTIVE OBJECTS

(76) Inventor: Yau Y. Hung, 3130 Quail Ridge Cir., Rochester Hills, MI (US) 48309

( * ) Notice: Subject to any disclaimer, the term of this patent is extended or adjusted under 35 U.S.C. 154(b) by 0 days.

(21) Appl. No.: 09/439,925

(22) Filed: Nov. 12, 1999

(51) Int. Cl.$^7$ .................................................. G01B 9/02
(52) U.S. Cl. ..................................... 356/520; 356/35.5
(58) Field of Search ................................ 356/520, 35.5

(56) References Cited

U.S. PATENT DOCUMENTS

| | | |
|---|---|---|
| 3,218,916 A | 11/1965 | Saunders |
| 4,142,797 A | 3/1979 | Astheimer |
| 4,887,899 A | 12/1989 | Hung |
| 5,004,345 A | 4/1991 | Hung |
| 5,094,528 A | 3/1992 | Tyson, II et al. |
| 5,341,204 A | 8/1994 | Grant et al. |
| 5,355,218 A | 10/1994 | Matsuda |
| 5,357,341 A | 10/1994 | Kuchel et al. |
| 5,523,846 A | 6/1996 | Haga |
| 5,680,210 A | 10/1997 | Swanson |

*Primary Examiner*—Frank G. Font
*Assistant Examiner*—Andrew H. Lee
(74) *Attorney, Agent, or Firm*—Carlson, Gaskey & Olds

(57) ABSTRACT

An electronic shearography system can measure deformation of an object and/or test the object for defects. Two laterally sheared images of the same object are produced by reflecting coherent light from the object, and directing rays, originating from different points on the object, into an image sensor. The rays become collinear, or nearly so, before entering the image sensor, where they produce a recordable interference pattern having a relatively low spatial frequency. The shearing effect comes from two mirrors, positioned to reflect light from the object. One mirror is partially reflective and the other mirror is totally reflective. The mirrors are arranged such that two laterally sheared images are formed, and the arrangement eliminates the need for further optical elements in performing the shearing. Thus, the invention simplifies the optical system, and increases its efficiency. The system can be used to measure relative displacements of two points on the same object, or of two points on different objects. The system can also be used to detect leaks in packages, by detecting changes in the interference pattern caused by changes in refractive index due to gas leaking from the test object.

30 Claims, 3 Drawing Sheets

NONDESTRUCTIVE TESTING OF DIFFUSELY REFLECTIVE OBJECTS

BACKGROUND OF THE INVENTION

The present invention relates to the field of nondestructive testing, and provides an interferometric method and apparatus for measuring deformations in diffusely reflective objects.

It has been known to test objects for defects using interferometric methods such as holography or shearography. In shearography, two laterally displaced (sheared) images of the same object are made to interfere with each other, resulting in a shearographic image. Embedded in the shearographic image is a random interference pattern. When the object is deformed, the interference pattern is slightly changed. By digitally comparing two shearographic images corresponding to deformed and undeformed states of the object, a recognizable fringe pattern is produced. Analysis of the fringe pattern reveals information about the deformation of the object, and, in particular, can indicate the presence or absence of a defect. Shearography is especially useful in testing bonded structures such as those found in aircraft or spacecraft, particularly where a potentially imperfect bond lies well below the surface of the structure.

An early description of the technique of shearography was presented by Hung and Taylor, in "Measurement of slopes of structural deflections by speckle-shearing interferometry", Experimental Mechanics, vol. 14, pages 281–285 (1974). Shearography was originally practiced by forming the interference pattern on photographic film.

Eventually, it was recognized that nondestructive testing could be performed much more efficiently if it were done electronically, i.e. by replacing the photographic film with a video image sensor (such as a charge coupled device) and comparing the shearographic images digitally, and displaying the fringe pattern on a video monitor. However, the inherent low resolution of video monitors, as compared with photographic film, limited the utility of electronic shearography systems.

A key element enabling the recording of shearographic images on a low resolution image sensor is an image shearing device which can produce an interference pattern of sufficiently low spatial frequency. The first practical apparatus for performing electronic shearography was described in U.S. Pat. No. 4,887,899, the disclosure of which is incorporated by reference herein. In the latter patent, the shearing effect is produced by the action of the double refraction of a birefringent material and a polarizer. Later patents have disclosed other methods of producing sheared images. For example, U.S. Pat. No. 5,094,528 discloses a shearography system resembling a Michelson interferometer. In the latter system, two light beams, taking slightly different optical paths, produce the sheared images which are made to interfere to form a composite interference pattern. The disclosure of the latter patent is also incorporated by reference herein.

The present invention provides a novel system and method of non-destructive testing that has several advantages over those of the prior art. In the present invention, the light collection efficiency is higher, and the degree of shearing is continuously and easily adjustable. The invention allows easy comparison of displacements of two distinct points on an object, or even of points located on different objects. The invention enables all of the above to be accomplished in a manner such that the resulting interference patterns can be recorded on a low-resolution video image sensor. The invention is also capable of introducing phase shifts and carrier fringes for automation of phase determination.

SUMMARY OF THE INVENTION

In one embodiment, the system of the present invention comprises a source of coherent light, positioned to illuminate a test object, and an image sensor connected to a computer. The image sensor may be a CCD camera or its equivalent. A pair of mirrors, one of which is partially reflective and the other of which is totally reflective, are positioned to direct light reflected from the test object into the video camera. Due to the partially reflective nature of one of the mirrors, and due to the orientation of the mirrors in a non-parallel arrangement, the system produces two laterally sheared images of the object, one formed of light reflected from the first mirror and the other formed of light reflected from the second mirror. These images are made to interfere with each other to produce a shearographic image which comprises a random interference pattern. By proper adjustment of the angles and/or spacing of the mirrors, the rays defining the two images become collinear, or nearly so, thereby producing an interference pattern having a very low spatial frequency, and hence one that is recordable on a video image sensor.

The invention can be used to compare displacements of two distinct points on a single object, or of two points on two different objects. To analyze points on different objects, the angle formed by the mirrors will usually be greater than in the case where a single object is being analyzed.

Analysis of the interference patterns obtained with the present invention need not be limited to qualitative examination of fringes. Instead, by using appropriate algorithms, one can determine the phase of the light received at every pixel of the image, using easily obtained measurements of light intensities, with and without deformation of the object, taken at known phase shifts. The phase of the light can be easily adjusted by varying the refractive index of a medium disposed between the mirrors, or by moving the mirrors themselves. In another alternative, one can derive phase information by superimposing a "carrier" fringe pattern, and performing Fourier analysis on the resulting interference pattern.

The invention can also be used to detect leaks in sealed packages, insofar as gas leaking from a package changes the density, and hence the refractive index, of the air in the vicinity of the package. The change in refractive index will change the interference pattern obtained with the methods described above, and can indicate a leak.

The present invention therefore has the primary object of providing a method and apparatus for nondestructive testing of diffusely reflective objects.

The invention has the further object of providing a method and apparatus for performing electronic shearography, in nondestructive testing of diffusely reflective objects.

The invention has the further object of providing a method and apparatus as described above, wherein the method can be used successfully with a video camera having low resolution.

The invention has the further object of providing a method and apparatus for determining relative displacements between two distinct points on an object, or between points on two different objects.

The invention has the further object of providing a nondestructive testing apparatus and method having improved efficiency.

The invention has the further object of providing a shearography system and method wherein the amount of shearing can be easily varied.

The invention has the further object of providing a nondestructive testing system having a simplified optical arrangement, and which is therefore robust, compact, and relatively insensitive to vibration and environmental disturbances.

The invention has the further object of providing a nondestructive testing system in which interference patterns formed in a video camera can be readily analyzed automatically.

The reader skilled in the art will recognize other objects and advantages of the present invention, from the following brief description of the drawings, the detailed description of the invention, and the appended claims.

DETAILED DESCRIPTION OF THE INVENTION

Figure 1:
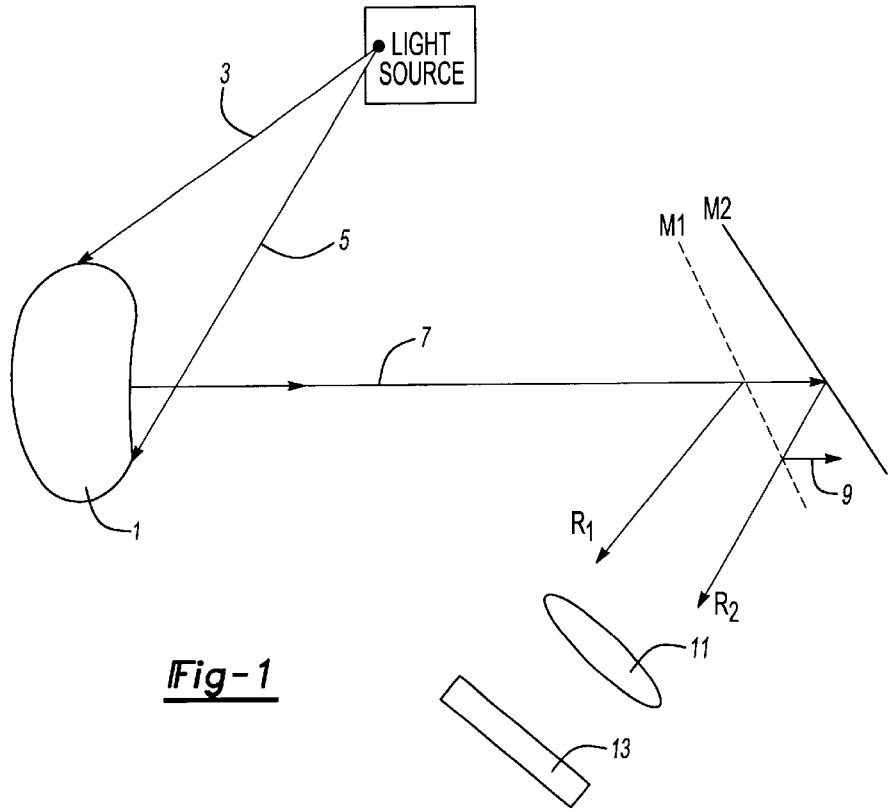
FIG. 1 provides a schematic diagram illustrating the operation of the present invention.

FIG. 1 provides a schematic diagram illustrating the basic principle of the present invention. Test object 1, having a diffuse surface, is illuminated by coherent light from a laser. The coherent light incident on the test object is symbolized by rays 3 and 5. Light scattered from the object passes to mirrors M1 and M2. Relative to the incident ray 7, the mirrors are arranged in series. In other words, relative to the object, mirror M2 is located behind mirror M1. Mirror M1 is a partial mirror which reflects a portion of the incident rays, as indicated by ray R1, and which transmits the remaining portion. Mirror M2 is totally reflective. As shown in FIG. 1, the portion of incident ray 7 that is transmitted to mirror M2 is reflected by mirror M2. Part of this reflected ray is again reflected by mirror M1, as indicated by arrow 9. The remainder of this reflected ray is transmitted by mirror M1, and emerges as ray R2.

The rays R1 and R2 are focused by lens 11, and an image is formed on image sensor 13 forming part of a video camera. The image sensor is typically a charge-coupled device (CCD). The lens may be part of a video camera; in practice, lens 11 and image sensor 13 may be components belonging to the same unit.

Thus, the image sensor receives two images of the object, one reflected by mirror M1 and the other reflected by mirror M2. If the mirrors are oriented at an angle such that they are non-parallel, one image will be laterally displaced, or sheared, relative to the other. In effect, the combination of mirrors splits the image into two laterally displaced, or sheared, images. Since the object is illuminated with coherent light, the two images interfere with each other, producing a random interference pattern (RIP). The random nature of the interference pattern is due to the fact that the surface of the test object is diffusely reflective.

The random interference pattern detected by image sensor 13 is digitized and stored in a computer memory. When the object is deformed, the interference pattern changes slightly. By digitally comparing the two random interference patterns before and after deformation, one generates a fringe pattern depicting the deformation of the object surface. A flaw in the object will produce a deformation anomaly that is translated into an anomaly in the fringe pattern. Thus, the process detects flaws in an object by looking for flaw-induced deformation anomalies.

Note that there are multiple reflections occurring between mirrors M1 and M2. The second reflection by mirror M1 is totally reflected by mirror M2, and then partially transmitted by mirror M1 to form a third image. Indeed, multiple reflections between mirrors M1 and M2, and partial transmission of incident rays by mirror M1, produce fourth, fifth, sixth, and higher order images. The transmittance of mirror M1 is adjusted to yield equal intensity for the first-order and second-order images. In this case, the higher-order images are weak relative to the first-order and second-order images. Consequently, the influence of the higher order images can be considered negligible. To achieve this optimal result, mirror M1 is coated for 62% transmission and 38% reflection, and mirror M2 is coated for 100% reflection.

Rays of a geometrical optical system are reversible. To understand how the invention combines two non-parallel beams to be collinear, one may interchange the object and the camera, to obtain the arrangement shown in FIG. 2. In this arrangement, rays R1 and R2 originate from two different points on test object 21, and are transmitted and/or reflected by mirrors M1 and M2 as before. As in the arrangement of FIG. 1, mirror M1 is partially reflective and mirror M2 is totally reflective. The rays are effectively combined by the mirrors, so that they travel through lens 23 and into image sensor 25. The image sensor is connected to computer 26. Although rays R1 and R2 are initially non-parallel to each other, the combined rays are collinear, or nearly collinear, i.e. the angle between the rays becomes zero or nearly zero. This feature is a key factor that allows the recording of the interference fringe pattern using an image sensor having low resolution.

The spatial frequency of the interference fringe pattern produced by two interfering rays is given by the following equation:

$$F = (2 \sin \alpha)/\lambda \qquad (1)$$

where F is the spatial frequency of the interference fringe pattern, $\alpha$ is half the angle between the two interfering rays, and $\lambda$ is the wavelength of interfering light. Since the combined rays received by the video camera are collinear, or nearly collinear (i.e. $\alpha \approx 0$), the spatial frequency of the interference pattern (i.e. the number of fringes per unit length) is extremely low, and therefore resolvable by a low-resolution sensor such as a CCD camera.

The present invention guarantees that the angle between the interfering rays is sufficiently small that the spatial frequency of the resulting interference pattern is small enough to be resolved by the image sensor used. Because the object illuminated with coherent light is optically rough, i.e. because it is a diffusely reflective object, light scattered from two different points on the object are made to interfere by the device of FIG. 2. The interference pattern so produced can be expressed mathematically as:

$$I = a_1^2 + a_2^2 + 2a_1a_2 \cos \phi \quad (2)$$

where I is the intensity of light at a point on the image sensor, $a_1$ and $a_2$ are the amplitudes of light scattered from two different points on the object, respectively, and $\phi$ is the phase difference between the two interfering rays. Due to the random variation of the surface depth of the diffuse object surface, the phase difference $\phi$ is random, and the intensity distribution defined by Equation (2) is a random interference pattern.

When the object is deformed, the relative displacement between two of the points on the object changes, and this change in displacement induces a phase change between the interfering rays. This phase change slightly alters the random interference pattern, and the pattern associated with the deformed state can be expressed as:

$$I' = a_1^2 + a_2^2 + 2a_1a_2 \cos (\phi + \Delta) \quad (3)$$

where I' is the intensity distribution resulting from the deformed state, and $\Delta$ is the phase change due to the relative displacement. The intensity distributions I and I', taken before and after deformation of the object, are digitized and stored in a computer memory. Computing the difference between I and I' yields a fringe pattern which depicts the relative displacement between two points on the object. This fringe pattern can be expressed mathematically as:

$$I - I' = 2a_1a_2 [\cos (\phi + \Delta) - \cos \phi] \quad (4)$$

Equation (4) shows that a minimum intensity is obtained when $\Delta$ has a value equal to zero or a multiple of $2\pi$. That is, $\Delta = 2\pi N$, where $N = 0, 1, 2, \ldots$, the values of N being called the fringe orders.

Figure 2:
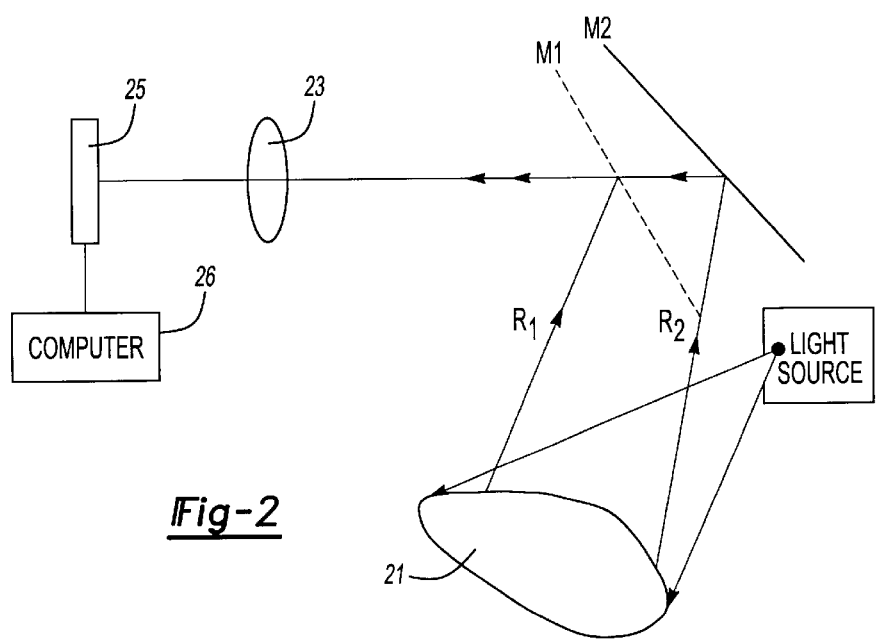
FIG. 2 provides another schematic diagram of the present invention, showing how two non-parallel rays scattered from two different points on an object are combined to become collinear or nearly collinear, thus providing a means for comparing displacements of different points on an object.

Note that FIGS. 1 and 2 are physically equivalent versions of the same concept, and both can be used in the same way.

Figure 3:
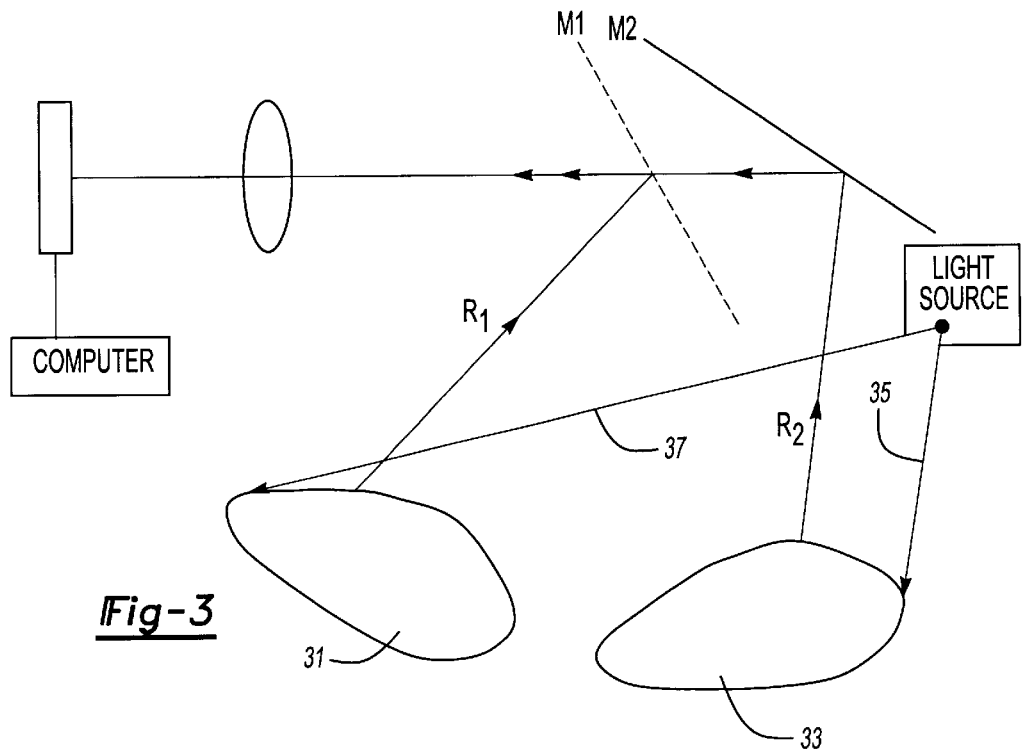
FIG. 3 provides a schematic diagram of an embodiment of the present invention used to determine relative displacement of points on two different objects.

FIG. 3 shows an arrangement for comparing deformation between two different objects. In this arrangement, objects 31 and 33 are illuminated by rays 37 and 35, coming from a source of coherent light. Ray R1 is reflected by object 31, and ray R2 is reflected by object 33. The operations of the mirrors M1 and M2, and the lens and image sensor, are the same as in the previous embodiment. In the arrangement of FIG. 3, there is a relatively large angle between the two mirrors. The large angle is what permits the rays from two different objects to combine and interfere with each other. When both of the objects are deformed, the fringe pattern represented by Equation (4) represents the relative displacement between the two objects. Therefore, the deformations of two different objects are compared. If one of the objects is deformed and the other object is not deformed, the fringe pattern represents the absolute displacement of the deformed object.

The present invention, as represented in the drawings of FIGS. 1–3, comprises an improvement over prior art shearography systems. The system of U.S. Pat. No. 4,887, 899, mentioned above, employs a birefringent material to achieve double refraction to produce the shearing effect. The present invention does not employ refraction, but instead uses double reflection. Because it relies on reflection and not refraction, the present invention processes light more efficiently than the system described in the above-cited patent.

Also, the present invention allows the magnitude of shearing to be continuously varied, the amount of shearing being controlled by adjusting the orientation of the mirrors.

In the present invention, one can vary the amount of shearing either by varying the angle of the mirrors, i.e. by tilting one mirror slightly, or by varying the spacing of the mirrors, i.e. by linearly translating one of the mirrors relative to the other. Either of the above will vary the amount of shearing, but variation of the angle (tilt) of a mirror is preferred. In general, it is preferable to minimize the separation between the mirrors, so as to maintain the ability to focus both images at the image sensor. Varying the amount of shearing by tilting one of the mirrors helps to keep the spacing between the mirrors at a minimum, as the amount of tilt needed to adjust the amount of shearing is generally only about one or two degrees. On the other hand, if the image sensor can tolerate a large "depth", i.e. if it can detect two different images which focus at different depths within the sensor, the amount of shearing could instead be controlled by linear translation of one of the mirrors.

The present invention also has the advantage that it allows a large "shear" to be achieved, enabling the comparison of deformation between two different objects.

The present invention also has the advantage that it enables one to introduce a phase shift in the fringe pattern, simply by translation of mirrors M1 or M2. Similarly, with the present invention, one can generate a carrier fringe pattern simply by tilting either mirror M1 or M2.

The present invention also has advantages when compared to Michelson interferometers used to perform shearography, as represented by U.S. Pat. No. 5,094,528, discussed above. A Michelson interferometer employs one beam splitter and two full mirrors. The present invention uses only one full mirror and one partial mirror. Thus, the optical configuration required to practice the present invention is significantly simplified, making it easier to align the optics. The present invention is also more robust, more compact, and less sensitive to vibration and environmental disturbances than a Michelson interferometer. The invention is also more light efficient, in that the light rays in the present invention pass through fewer optical elements. The present invention also offers a greater angular field of view than what is available in the prior art.

The fringe phase $\Delta$ of Equation (4) contains the information about the relative phase change between the two interfering wavefronts, which can be related to surface deformation. In the prior art, human interpretation of the fringe pattern has been used to determine the fringe phase. But the analysis can be performed entirely by computer, as described below. Two processes will be described, the first being a phase-shift technique, and the second being a carrier fringe technique.

In the phase-shift technique, one adds a uniform change of phase to the wavefronts reflected by mirrors M1 and M2. This is the phase shift which modifies the random interference pattern of Equation (2) as follows:

$$I = a_1^2 + a_2^2 + 2a_1a_2 \cos (\phi + S) \quad (5)$$

where S is the uniform phase change (phase shift). Note that $\phi$ in the above equation is the phase difference of the interfering beams, and the spatial variation of $\phi$ is random because the interfering wavefronts are scattered from a diffuse surface.

The introduction of phase shifts allows one to generate additional equations for determining phase. Many different algorithms exist for the determination of wavefront phase from the phase-shifted random interference pattern. See, for example, "Phase Measurement Techniques for Nondestructive Testing", by K. Creath, Proceedings of Society for Experimental Mechanics Conference on Hologram Interferometry and Speckle Metrology, pages 473–78, Baltimore, Md., Nov. 5–8, 1990. The following example shows a procedure for calculating the phase, using interference patterns corresponding to four different phase shift values.

Suppose that one obtains four random interference patterns, corresponding to values of S=0, $\pi/2$, $\pi$, and $3\pi/2$. Using Equation (5), the random interference patterns can be represented by the following equations:

$$I_1 = a_1^2 + a_2^2 + 2a_1 a_2 \cos(\phi) \tag{6a}$$

$$I_2 = a_1^2 + a_2^2 + 2a_1 a_2 \cos(\phi + \pi/2) \tag{6b}$$

$$I_3 = a_1^2 + a_2^2 + 2a_1 a_2 \cos(\phi + \pi) \tag{6c}$$

$$I_4 = a_1^2 + a_2^2 + 2a_1 a_2 \cos(\phi + 3\pi/2) \tag{6d}$$

The intensity values $I_1$, $I_2$, $I_3$, and $I_4$ are sequentially digitized and stored in a computer memory. The phase $\phi$ of the random interference pattern can be calculated from Equations 6a–6d, using basic trigonometry, by $$\phi = \text{Arctan}\left[(I_4 - I_2)/(I_1 - I_3)\right] \tag{7}$$

After the surface is deformed, the phase shift modifies the interference pattern of Equation (5) to:

$$I' = a_1^2 + a_2^2 + 2a_1 a_2 \cos(\phi + \Delta + S) \tag{8}$$

In a manner similar to what was done in the undeformed state, one obtains an interference pattern for each of four phase values, all in the deformed state. Thus, one can determine the phase ($\phi + \Delta$) in Equation (8) as follows:

$$(\phi + \Delta) = \text{Arctan}\left[(I'_4 - I'_2)/(I'_1 - I'_3)\right] \tag{9}$$

Subtracting Equation (7) from Equation (9) allows one to determine the value of $\Delta$, the fringe phase related to the surface deformation:

$$\Delta = \text{Arctan}\left[(I'_4 - I'_2)/(I'_1 - I'_3)\right] - \text{Arctan}\left[(I_4 - I_2)/(I_1 - I_3)\right] \tag{10}$$

The above-described phase determination procedure permits the phase $\Delta$ to be calculated, by computer, at every pixel of the digitized image.

The above-described technique, which relies on known phase shifts, can be used only if one can actually perform precise phase shifts. In the present invention, the phase shift can be achieved by either of the following methods.

First, by slightly moving (i.e. linearly translating) mirror M2 towards mirror M1, or by moving mirror M2 towards mirror M1, a controlled uniform phase change can be introduced into the two reflected rays R1 and R2.

Figure 4:
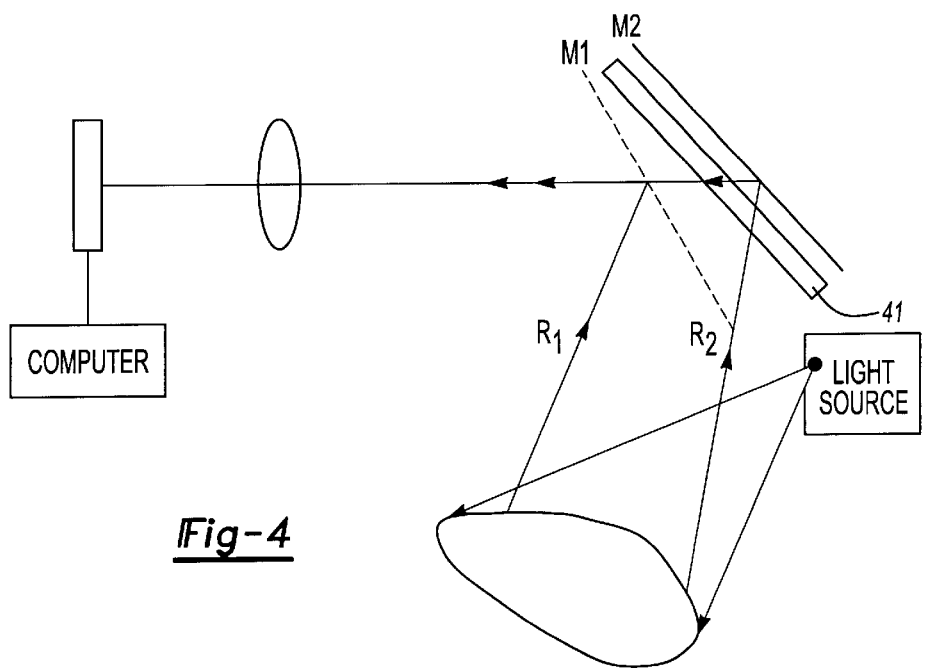
FIG. 4 provides a schematic diagram of an embodiment of the present invention in which the refractive index of a material between the mirrors is varied to produce a known phase change.

Secondly, by changing the refractive index of the medium traversed by the light, one can also introduce a desired phase change. A convenient method for doing so is to place a material having an adjustable refractive index, such as a liquid crystal, between mirrors M1 and M2. By adjusting the refractive index of this material, one can induce the desired uniform phase change between the two reflected rays. FIG. 4 illustrates the latter technique. A material 41 having an adjustable refractive index, is inserted between mirrors M1 and M2. The material 41 need not be a liquid crystal, but can include any other material whose refractive index can be controlled. The other components are similar to those of the embodiments described above.

Of the two phase-shift techniques described above, the second technique is preferred because it is easier to control precisely the refractive index of a material than to control precisely the translation of a mirror.

In the carrier fringe technique, a linear spatial phase variation is superimposed onto the deformation phase by tilting one of the mirrors M1 or M2. A linear phase variation can also be produced by inducing a linear refractive index change in the medium between the two mirrors. The carrier fringe technique results in the following modification of Equation (2):

$$I' = a_1^2 + a_2^2 + 2a_1 a_2 \cos(\phi + \Delta 2\pi f x) \tag{11}$$

where f is the frequency of the carrier fringes, and f depends on the amount of tilting of the mirror. Equation (11) corresponds to the case where the mirror is tilted so as to introduce a linear phase variation in the x-direction. This direction is perpendicular to the axis of the tilt.

Subtraction of Equation (11) from Equation (2) yields:

$$I - I' = 2a_1 a_2 [\cos(\phi + \Delta + 2\pi f x) - \cos \phi] \tag{12}$$

Equation (12) shows the formation of a carrier fringe pattern. Dark fringe lines correspond to $$\Delta + 2\pi f x = 2\pi N \tag{13}$$

where N=0, 1, 2, . . . are the fringe orders. In this example, the carrier fringes comprise a plurality of linear, parallel fringes, equally spaced, and perpendicular to the x-axis.

Introduction of the carrier fringes increases the density of the fringe lines, and it places the fringe phase around a known frequency f. Hence, the information can be separated by performing a band-pass frequency filtering step in the frequency domain, i.e. a Fourier technique. One performs this step by first computing the Fourier transform of Equation (12), then performing band-pass filtering, and then computing an inverse Fourier transform. This procedure also allows the fringe phase to be determined using a Fourier analysis algorithm.

An advantage of the carrier fringe technique is that it requires that one obtain only one interference pattern in the undeformed state, and one interference pattern in the deformed state. Also, the carrier helps to evaluate the object qualitatively. A defect in the object generally produces an obvious distortion in the fringe pattern, which can be detected visually.

The present invention has many applications. As discussed above, it permits measurement of the amount of deformation of an object, or comparison of deformations in two different objects, including both static and dynamic deformations. The invention can be used in nondestructive testing, by revealing defects in an object which manifest themselves through defectinduced deformation anomalies observed as anomalies in the fringe phase. Moreover, although the invention measures surface deformation, it usually will also detect internal defects, because such defects will influence the deformation of the surface, unless the internal defect is located very far from the surface of the object.

The present invention can also be used for detecting leaks in sealed objects. Gas escaping from a sealed package will disturb the air in front of the object, thereby causing a change in density of that air. This change in density causes a change in refractive index. The change in refractive index is functionally equivalent to a deformation of the object, in that the change in refractive index will cause a phase change between two wavefronts which are combined to form an interference pattern. Thus, observation of a change in an interference pattern can determine the presence or absence of a leak. The location of the leak can also be determined from the phase disturbance.

Figure 5:
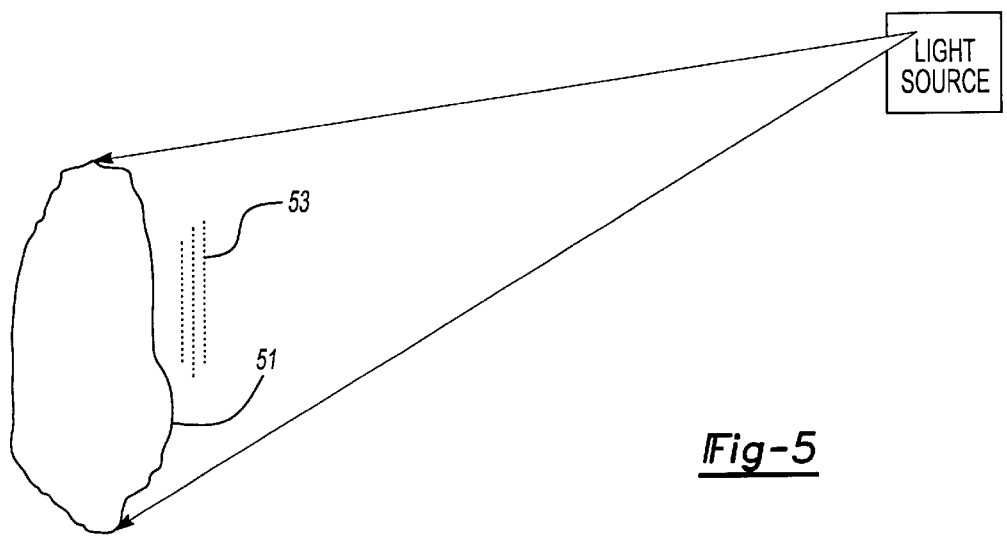
FIG. 5 provides a schematic-diagram of an embodiment of the present invention which is used to detect leaks in a sealed package.

FIG. 5 illustrates the illumination of a test object with coherent light, the object having a leak at a position identified by reference numeral 51. Gas 53 escaping from the package is shown in the immediate vicinity of the object. The components used to analyze the fringe pattern are the same as in the preceding embodiments, and are therefore not repeated in FIG. 5.

In the embodiments discussed above, the deformation of the object was static. It is also possible to use the present invention to measure a time-dependent deformation. In the latter case, the image sensor 25 would be a high-speed image sensor, and computer 26 would be a device capable of storing and processing video frames at a high rate. In operation, the test object is continuously deformed, and the shearographic images produced by the apparatus are continuously digitized at a rate depending on the deformation rate. Each image is stored in the memory of the computer. In essence, a time dimension has been added to the image data. Instead of a conventional fringe analysis method, one can use the data analysis technique described below.

Figure 6:
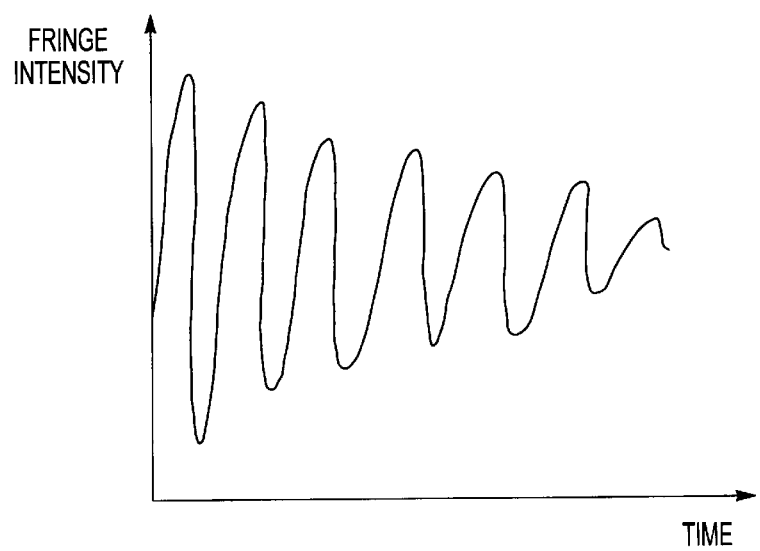
FIG. 6 provides a graph showing the intensity of light measured at a particular pixel, as a function of time, for a time-varying deformation.

To study the deformation of any point on the object as a function of time, the pixel intensity corresponding to that point is retrieved from the computer, for each point in time. FIG. 6 shows a typical plot of the light intensity measured at a given pixel, as a function of time. Since the intensity varies in well-defined cycles, as the object is further deformed, one can determine the total deformation at any time by counting the number of cycles preceding that point. The number of cycles is equivalent to the fringe phase.

The above technique is performed at a single point. In general, it may be necessary to repeat the analysis for other points. The data recording itself is performed across a full field, so it is easy to extract the data for any desired point.

The above method has an advantage over a full-field fringe analysis technique in that the deformation of any point on the object, at any given time, can be determined independently of other points on the object.

The invention can be modified in various ways. The type of video camera used can be varied, and additional optical elements can be added as necessary. The exact structure of the mirrors, and the devices used to translate or rotate them, can be varied. The invention is also not limited by the type of laser used to illuminate the object, or by the medium having an adjustable refractive index that may be inserted between the mirrors. These and other modifications, which will be apparent to those skilled in the art, should be considered within the spirit and scope of the following claims.

What is claimed is:

1. A method of nondestructive testing of an object, comprising:
   a) illuminating the object with coherent light,
   b) directing light rays reflected from two distinct points on the object into an image sensor so as to interfere with each other to form an interference pattern comprising two laterally sheared images, the interference pattern being detectable by the image sensor, and
   c) analyzing the interference pattern to determine a condition of the object,
   wherein step (b) is performed by reflecting one of said rays from a first mirror, and reflecting another of said rays from a second mirror.

2. The method of claim 1, wherein one of said mirrors is partially reflective, and wherein one of said mirrors is totally reflective, and wherein one of said rays is made to pass through the partially reflective mirror so as to be reflected by the totally reflective mirror.

3. The method of claim 1, wherein the laterally sheared images are produced by said first and second mirrors and by no other optical element.

4. The method of claim 1, wherein the rays reflected from the mirrors define an angle sufficiently small to make a spatial frequency of the interference pattern resolvable by the image sensor.

5. The method of claim 1, further comprising adjusting an angle between the mirrors so as to vary an amount of lateral shearing.

6. The method of claim 1, further comprising adjusting a spacing between the mirrors so as to vary an amount of lateral shearing.

7. The method of claim 1, further comprising varying a refractive index of a medium disposed between the mirrors, so as to vary a phase of light received at the image sensor.

8. The method of claim 1, wherein steps (a) and (b) are performed while the object is being continuously deformed.

9. The method of claim 8, wherein step (c) includes analyzing an intensity of light received at at least one particular pixel, and counting a number of cycles of intensity fluctuation caused by deformation of the object.

10. A method of determining relative displacements of two points on two distinct objects, comprising:
    a) illuminating the objects with coherent light,
    b) causing light rays reflected from two distinct points on the object to enter an image sensor and interfere with each other to form an interference pattern comprising two laterally sheared images, the interference pattern being detectable by the image sensor, and
    c) analyzing the interference pattern so as to determine relative displacements of said points, wherein step (b) is performed by reflecting one of said rays from a first mirror, and reflecting another of said rays from a second mirror.

11. The method of claim 10, wherein one of said mirrors is partially reflective, and wherein one of said mirrors is totally reflective, and wherein one of said rays is made to pass through the partially reflective mirror so as to be reflected by the totally reflective mirror.

12. The method of claim 10, wherein the laterally sheared images are produced by said first and second mirrors and by no other optical element.

13. The method of claim 10, further comprising adjusting an angle between the mirrors so as to vary an amount of lateral shearing.

14. The method of claim 10, further comprising adjusting a spacing between the mirrors so as to vary an amount of lateral shearing.

15. A method of detecting a leak in a sealed package, comprising:
    a) illuminating the package with coherent light,
    b) causing light rays reflected from two distinct points on the package to enter an image sensor and to interfere with each other to form an interference pattern comprising two laterally sheared images, the interference pattern being detectable by the image sensor, and
    c) analyzing the interference pattern so as to determine relative displacements of said points,
       wherein step (b) is performed by reflecting one of said rays from a first mirror, and reflecting another of said rays from a second mirror.

16. The method of claim 15, wherein one of said mirrors is partially reflective, and wherein one of said mirrors is totally reflective, and wherein one of said rays is made to pass through the partially reflective mirror so as to be reflected by the totally reflective mirror.

17. The method of claim 15, wherein the laterally sheared images are produced by said first and second mirrors and by no other optical element.

18. The method of claim 15, further comprising adjusting an angle between the mirrors so as to vary an amount of lateral shearing.

19. The method of claim 15, further comprising adjusting a spacing between the mirrors so as to vary an amount of lateral shearing.

20. In a method for nondestructive testing of an object, the method comprising reflecting coherent light from the object such that rays from two distinct points on the object enter an image sensor and interfere with each other to form an interference pattern comprising two laterally sheared images, the interference pattern being detectable by the image sensor, the improvement wherein the rays from said two distinct points are reflected, by two separate mirrors, towards the image sensor, and wherein the sheared images are produced by the mirrors and by no other optical element.

21. The improvement of claim 20, further comprising adjusting an angle between the mirrors so as to vary an amount of lateral shearing.

22. The improvement of claim 20, further comprising adjusting a spacing between the mirrors so as to vary an amount of lateral shearing.

23. Apparatus for nondestructive testing of diffusely reflective objects, comprising:

a) a source of coherent light, positioned to illuminate a test object, b) an image sensor, the image sensor being connected to a computer for storing and processing images detected by the image sensor, and c) first and second mirrors, positioned to direct light, reflected from the object, to the image sensor,
wherein the first mirror is partially reflective and wherein the second mirror is totally reflective, and wherein the second mirror is positioned behind the first mirror, relative to the object.

24. The apparatus of claim 23, wherein at least one of the first and second mirrors can be tilted.

25. The apparatus of claim 23, wherein at least one of the first and second mirrors can be linearly translated.

26. The apparatus of claim 23, further comprising a medium having an adjustable refractive index, said medium occupying a region between the first and second mirrors.

27. Apparatus for nondestructive testing of diffusely reflective objects, comprising:

a) means for illuminating a test object with coherent light, b) means for detecting an image, the detecting means being connected to means for storing and processing images detected by the detecting means, and c) first an second mirrors, positioned to direct light, reflected from the object, to the detecting means,
wherein the first mirror is partially reflective and wherein the second mirror is totally reflective, and wherein the second mirror is positioned behind the first mirror, relative to the object.

28. The apparatus of claim 27, further comprising means for tilting at least one of the first and second mirrors.

29. The apparatus of claim 27, further comprising means for translating at least one of the first and second mirrors.

30. The apparatus of claim 27, further comprising means for varying a refractive index of a medium occupying a region between the first and second mirrors.

* * * * *